Patented Oct. 15, 1935

2,017,593

UNITED STATES PATENT OFFICE 2,017,593

COMPOSITION FOR TREATING COLLOIDAL SURFACES

William C. Geer, Ithaca, N. Y.

No Drawing. Application July 7, 1930,
Serial No. 466,049

2 Claims. (Cl. 134—17)

This invention relates to the preparation of a liquid composition and more particularly to the preparation of a liquid adapted to give improved characteristics to a rubber surface to which it is applied.

As described in the co-pending Geer and Scott application, Serial No. 465,790, filed July 7, 1930, it has been found that by adding a suitable liquid to the vulcanized rubber surface of a covering or overshoe applied to a surface exposed to ice-forming conditions, such as the surface of an airplane exposed to cold, damp weather, the adhesion of ice to the surface may be substantially reduced, with the result that the accumulation of excessive quantities of ice upon these surfaces may be prevented. Since the ice deposited upon such a surface may also be held in position by atmospheric pressure or suction and by the air forces acting upon a moving surface, it is sometimes desirable to provide means such as described in the aforesaid co-pending application for initially moving the ice which may be deposited upon the treated rubber surface.

The liquid to be used for this purpose should be one which has a freezing point below the ice-forming temperatures and which is fluid at these temperatures. It should be of low viscosity at these temperatures and should not be sticky, and hence adhesive toward ice. It should also be a material which will be absorbed into the rubber, but which will not swell or weaken the rubber to such an extent that it would have insufficient tensile strength for the use to which it is applied. It is also important that the liquid be of relatively high boiling point in order that it may not evaporate from the surface at the higher temperature to which it may be subjected.

A large number of oils are absorbed into vulcanized rubber, but ordinarily with the result that the rubber is thereby caused to swell to such an extent that its tensile strength is substantially decreased, and its physical properties are otherwise deteriorated. Because of this effect it is very difficult to use most oils in contact with rubber.

It is the object of this invention to produce a liquid which may be applied to rubber without substantially deteriorating the rubber surface. It is a further object of the invention to produce such a liquid which will reduce the adhesion of ice to the surface, and at the same time, one which will not evaporate from the surface at ordinary temperatures. Another object of the invention is to provide a liquid which will be absorbed by the rubber and will produce a substantially dry surface at ordinary temperatures, but which will exude from the rubber at ice-forming temperatures.

Other objects will become apparent from the following description and from the use of the product defined in the claims.

I have found that by mixing with an oil which will be absorbed into the rubber surface and give the desired lubricating or non-adhesive characteristics, an oil which is insoluble in the rubber and which will prevent swelling thereof, a composition will be produced which will give the desired surface and which will not substantially swell or otherwise deteriorate the rubber.

One of the following liquids of low freezing point and relatively high boiling point may be added to a rubber surface and will substantially decrease the adhesion of ice to the surface:

|  | Freezing point | Boiling point |
| --- | --- | --- |
|  | ° C. | ° C. |
| Tetrahydronaphthalene | −25 | 206 |
| Dekahydronaphthalene | −125 | 193.3 |
| Pine oil | −25 | 150-185 |
| Ethyl benzoate | −34.6 | 213.2 |
| p-cymene | −73.5 | 176.5 |
| Castor oil | −12 | above 300 |
| Lubricating oil from petroleum selected for low freezing point | −15 | above 250 |

The addition of some of these liquids to vulcanized rubber will, however, cause the rubber to swell and will decrease its tensile strength. By adding a liquid such as diethyl phthalate or butyl tartrate to one of the above oils, the swelling of the rubber and the decrease in tensile strength will be greatly reduced. If the two liquids to be mixed are not miscible with each other, they may be brought into common solution by adding a liquid capable of dissolving both of them. For example, diethyl phthalate and pine oil, which are mutually immiscible, may be brought into solution by adding castor oil, which in itself is insoluble in rubber and therefore further reduces the swelling of the rubber.

As an example of a suitable composition to be applied to a rubber surface, and which will reduce the adhesion of ice to the rubber surface, the following substances may be mixed in the proportions stated:

|  | Parts by volume |
| --- | --- |
| Pine oil | 4 |
| Diethyl phthalate | 4 |
| Castor oil | 1 |

This particular mixture has the added advantage that its solubility in rubber is reduced at the ice forming temperatures, so that at these temperatures it will exude from and render the surface well lubricated while it will produce a substantially dry surface in the rubber at ordinary temperatures.

When this mixture is applied to a vulcanized rubber of the composition hereinafter described for use in preventing the accumulation of ice upon aircrafts, the oil will exude from the surface at the ice forming temperature and replace any oil which may be removed from the surface by the air forces, by vaporization or by removal with the ice. Additional oil may be applied from time to time as the supply is exhausted. When a neutral oil which does not radically alter the physical properties of the rubber is absorbed in rubber the rubber is actually preserved against oxidation.

Any rubber mixture, capable of satisfactory vulcanization, may be used for producing the rubber surface, the following typical mixture being given as an example of such a composition:

| | Parts |
|---|---|
| Smoked sheet | 100 |
| Zinc oxide | 10 |
| Sulfur | 3 |
| Accelerator | 1 |

When the oil is added to the vulcanized rubber to reduce the adhesion of ice to the surface, the rubber mixture should be one, such as the above, with little or no oil soluble sticky material that would render the surface adhesive to ice. Some other colloidal surface may be used in place of rubber, if the surface is to be one that is devoid of irregularities into which water might penetrate and, upon freezing, anchor itself.

When a vulcanized rubber of the above described composition is soaked in pure pine oil for 24 hours, its average increase in volume will be greater than 50%, and its average decrease in tensile strength will be greater than 75%. However, when a vulcanized rubber of the same composition is soaked for 24 hours in the mixture of oils referred to above, it was found to have an increase in weight of about 19%, an increase in gauge or volume of about 7½% and an average decrease in tensile strength of about 12½%. It is apparent, therefore, that although an appreciable weight of oil had been absorbed into the rubber, the volume had been only relatively slightly increased and the tensile strength had been but moderately affected.

Although I have described a particular mixture of liquids, it is not intended to thereby limit the invention to the specific liquids or proportions mentioned. Other vegetable, mineral or synthetic oils may be used to give the desired lubricating or reduced adhesion characteristics. Other liquids than those described may also be added to such oils to reduce the swelling of the rubber and the resultant decrease in tensile strength and deterioration of other physical properties. Such liquids may be alcohols, ketones and other esters which possess the property of mixing with nitrocellulose or, as hereinbefore indicated, castor oil. The boiling point and freezing point may be unimportant in the particular use to which the liquids may be applied, in which event a wide range of selection may be had. Furthermore the particular oil added for this purpose may not come within the range of temperatures desired, although the resultant mixture may be within that range.

It is also intended to not restrict the invention to the particular use in connection with which it has been described. This liquid mixture may be applied to other surfaces to reduce the adhesion of ice to the surface thereof. For instance, it may be applied to a fire hose, to insulated electric light wires, etc., to automobile windshields, to refrigerating coils, etc., and the oil soaked rubber surface may be also applied to such articles as refrigerating coils, telephone lines, masts and other parts of sailing vessels, etc.

It will also be apparent that it may be used in many other connections, for example, in oil lubricating systems or for producing printing inks which will not deteriorate the rubber ink-spreading rolls used on high speed printing presses. As an example of a lubricating oil suitable for application to rubber surfaces, 4 parts by volume of a lubricating oil may be mixed with 2 parts of diethyl phthalate and 4 parts of castor oil. An improved printing ink embodying my invention may comprise 10 parts by volume of printing ink, 8 parts of castor oil and 2 parts of diethyl phthalate.

What I claim is:

1. A composition of matter which consists of a mixture of non-volatile liquids, which has a freezing point below ice-forming temperatures, which is fluid, of low viscosity and non-adhesive toward ice at these temperatures, which is absorbed by rubber at ordinary temperatures but is lubricating at ice forming temperatures, one such liquid being freely soluble in rubber and capable of swelling rubber and another being insoluble in rubber and capable of preventing the swelling of rubber, the liquids being in common solution in such relative proportions that the mixture will not substantially swell or otherwise deteriorate a rubber surface to which it is applied.

2. A liquid composition for inhibiting adhesion of ice to a rubber surface when applied thereto consisting of a mixture of pine oil, diethyl phthalate and castor oil.

WILLIAM C. GEER.